3,112,196
METAL ALLOY SUITABLE FOR CONTROLLING THERMAL NEUTRON REACTORS
Robert J. Schier, Richland, Wash., assignor to the United States of America as represented by the United States Atomic Energy Commission
No Drawing. Filed Oct. 28, 1953, Ser. No. 388,929
3 Claims. (Cl. 75—175.5)

The present invention relates to a neutron-absorbent alloy material which is particularly useful in the control of the neutron flux of a neutronic reactor. The alloy material of the subject invention is especially useful for controlling neutron flux in neutronic reactors of the thermal type.

In the operation of a neutronic reactor it is common to employ a quantity of material capable of absorbing neutrons and particularly those thermal neutrons which are present in excess of that level required to operate a reactor at a predetermined flux as a control. The material so used should have a microscopic capture cross section for thermal neutrons of at least 100 barns (equivalent to a macroscopic cross section of about 4.00 cm.$^{-1}$). In addition to the nuclear properties necessary for absorbing these excess neutrons, the neutron-absorbent material should also be suitably corrosion-resistant and have the physical properties necessary for fabrication of said material into suitable forms.

Normally, neutron irradiation induces secondary radiation from the material exposed to neutron flux. Furthermore, the absorption of neutrons and the secondary radiation induced thereby is usually accompanied by substantial local heating of the neutron-absorbent material. Moreover, the usual control rod materials are high-density materials having substantial weight.

It is therefore an object of the instant invention to provide a corrosion-resistant, light-weight, low-density, neutron-absorbent structural alloy material wherein the secondary radiation and local heating incident to irradiation with neutrons is substantially reduced.

It is an additional object to provide an alloy suitable for shielding neutron-emitting substances and a method of fabricating said material.

Other objects and advantages of the instant invention will be apparent upon further examination of the specification.

I have discovered that a relatively light-weight, low-density, corrosion-resistant, structural alloy material can be formed by arc-melting in the absence of air a mixture consisting essentially of titanium and gadolinium oxide ($Gd_2O_3$). Gadolinium has a capture cross section for thermal neutrons of 44,000, so that even as little as about 0.62 wt. percent gadolinium incorporated in titanium will give a macroscopic total capture cross section of about 4.07 cm.$^{-1}$. Up to 6% by weight gadolinium in the form of gadolinium oxide can be incorporated with titanium metal and uniformly distributed therein. An alloy containing only 0.6 wt. percent gadolinium possesses unusual hardness in spite of the increased oxygen content introduced by adding said gadolinium as the oxide. The expected embrittlement owing to the presence of additional oxygen is not observed in those alloys containing as much as 4% gadolinium added as gadolinium oxide, which alloy is relatively soft and can be rolled and forged with ease into structures having the requisite nuclear and physical properties for absorbing neutrons and thereby controlling neutron flux in a nuclear reactor.

There are numerous considerations which enter into the choice of a suitable control material for particular nuclear reactors. Thus the neutron flux, the neutron energy range in which the reactor is to be operated, the temperature requirements of the reactor and the space limitations are all factors in the choice of a suitable control material. However, in general it may be said that a suitable material for a control element of a nuclear reactor should have a macroscopic absorption cross section of at least about 4 barns. A macroscopic cross section is usually defined as $\Sigma$ in the following equation:

$$\Sigma = N\sigma = 0.602 \, \rho/A \times \sigma$$

where N is the number of atoms in one cc., $\rho$ is the density in grams per cc., A is the atomic weight, and $\sigma$ is the microscopic cross section in barns. For a homogeneous mixture or compound the macroscopic cross section is the sum of the "partial" macroscopic cross sections of the constituents.

$$\Sigma = \Sigma_1 + \Sigma_2 + \Sigma_3 + \ldots$$

Because of its very high microscopic cross section (44,000 barns) a very small amount of gadolinium (as the oxide) alloyed with titanium will form a nuclear control material of suitable nuclear characteristics. Thus a gadolinium oxide-titanium alloy wherein the gadolinium is present in the alloy in a concentration of 0.62 wt. percent will have a macroscopic cross section of approximately 4.07. A titanium-6 wt. percent gadolinium (as the oxide) alloy has a macroscopic cross section of approximately 48.5. The present invention is primarily concerned with a titanium alloy containing gadolinium (as the oxide) in the above range. The alloy containing a high gadolinium content is a particularly suitable control material for nuclear reactors having a $U^{235}$ nuclear fuel for use in compact power plants of the ship or aircraft types.

The arc-melting of the titanium-gadolinium oxide mixture is suitably effected on a cold copper hearth with a tungsten electrode for heating and forming the alloy at temperatures preferably between about 1000 and 1700° F., in the absence of air. A vacuum or a highly purified inert gas such as argon, suitably at a pressure of about 10 cm. Hg., serves to efficiently exclude oxygen and other undesirable gases from the system during the melting step. These titanium-gadolinium oxide alloys can be made from iodide titanium sponge and gadolinium oxide ($Gd_2O_3$).

The hardness of the alloys formed by arc-melting increases with the number of melts. Triple-melted ingots have a hardness of 285 Brinell which is increased to 330 Brinell upon reheating. The double-melted ingot can be rolled without jacketing while the triple-melted ingot is readily forged at 1700° F. but may crack upon warm rolling. This cracking may be avoided by first jacketing the ingot in a steel sheath and then rolling at an elevated temperature, for example 1700° F., so as to effect some reduction. About 0.05 inch per pass is usually adequate. The steel jacket is removable from the alloy base by pickling in nitric acid without affecting said base. Since repeated melting may cause the alloy strip to become brittle at room temperature, it is recommended that melting of the ingot be limited to as few meltings as will be required to provide satisfactory distribution of the gadolinium oxide. Upset forging of the ingot is helpful in achieving uniform distribution.

The process of the present invention may be further illustrated by the following example.

*Example*

Varying charges of gadolinium oxide ($Gd_2O_3$) in powder form were encapsulated within cylinders of iodide titanium sponge to form approximately 10 gram melts. These melts were than arc-melted with a tungsten electrode on a cold copper hearth in an atmosphere of highly purified argon (99.92%) at 10 cm. pressure. The gadolinium oxide powder was enclosed within the sponge titanium prior to melting so as to preclude any loss of the gadolinium oxide powder from action of the arc. Each melt of 10 grams was melted six times in the arc furnace. Each button was inverted with each melt to insure complete solution of the $Gd_2O_3$. Upon heating, the charge would consolidate into a symmetrical oblate spheroid. All melts were homogeneous and sound with the exception of the alloy containing 5.2% $Gd_2O_3$ which contained a minute amount of nonmetallic segregate on the surface. The composition, hardness and microstructure of two of the ingots were as follows:

| (Nominal) Percent Composition by Weight (Balance Ti) | Melt #1 0.6 Gd [1] | Melt #2 5.20 Gd [1] |
| --- | --- | --- |
| Weight of charge in grams (Ti) | 9.9518 | 9.3942 |
| Weight of charge in grams ($Gd_2O_3$) | 0.0696 | 0.6102 |
| Weight of charge in grams (total) | 10.0214 | 10.0044 |
| Final weight in grams | 9.9996 | 9.9497 |
| Weight change in grams (loss) | −0.0218 | 0.0547 |
| Vickers hardness of melt (10 kg. load) top | 188 | 233 |
| Vickers hardness of melt (10 kg. load) bottom | 193 | 232 |

[1] Added as $Gd_2O_3$.

Fabrication of the resultant alloy was effected by heating the buttons in air in a muffle furnace at 850° C. and maintaining said temperature long enough to insure attainment of this temperature in the button, which was then subjected to hot rolling at 850° C. After descaling by sand blasting, the ingots were then reduced 10% per pass by rolling, with reheating to 850° C. between each pass, until their thickness was 0.040 inch. After rolling they were annealed at 850° C. for periods from 15 minutes to 3½ hours and air cooled to room temperature. The rolling behavior for alloy #1 was good and yielded a smooth strip in the as-rolled condition, and no imperfections were visible after descaling by sand blasting. The rolling behavior for alloy #2 was also good. The triple-melted ingot formed by remelting the double-melted ingot had a hardness of 285 Brinell. The strip material can be hot-formed into tubing and seam-welded. The over-all Vickers hardness number of the annealed strip of alloy #1 was 191 and for the annealed strip of alloy #2 was 204. The approximate macroscopic absorption cross sections of the two alloys were approximately 4.07 and 43.4, respectively. Examination of the microstructure of the alloy #1 annealed strip showed equiaxed alpha-titanium plus a small amount of a well dispersed second phase, presumably $Gd_2O_3$, while the microstructure of the alloy #2 annealed strip showed much more second phase oriented in the rolling direction in addition to the equiaxed alpha-titanium.

The titanium-gadolinium oxide alloys may also be used as target material in particle accelerators and are particularly suitable materials for fabrication of shields on containers for the storage or transportation of neutron-emitting materials such as radium-beryllium mixtures.

The process of the present invention is capable of numerous modifications. In general it may be said that the use of any equivalents or modifications of procedure which would naturally occur to those skilled in the art are included within the scope of the process claims of the present invention.

What is claimed is:

1. A homogeneous arc-melted alloy suitable for nuclear reactor control material consisting essentially of titanium and up to about 6 wt. percent gadolinium as gadolinium oxide.

2. A homogeneous arc-melted alloy consisting essentially of titanium and about 0.6% by weight gadolinium as the oxide having a hardness value of about 195 Vickers.

3. A rolled homogeneous arc-melted alloy strip consisting essentially of titanium and up to about 4 wt. percent gadolinium wherein the yield strength is 73,800 p.s.i., and Vickers hardness number is 280 in titanium as-rolled form.

References Cited in the file of this patent

UNITED STATES PATENTS 2,541,764  Herres et al. _____ Feb. 13, 1951
2,866,741  Hausner _____ Dec. 30, 1958

OTHER REFERENCES

Welter et al.: "Canadian Mining Journal," March 1953, pp. 59–66.

Sun et al.: "Glass Ind.," 31, 507–15 (1950).

"Nucleonics," vol. 11, No. 6, pub. (June 1953) by McGraw-Hill Pub. Co., Inc., New York, pages 20 and 22.